Nov. 23, 1926.  
F. J. GOODENOW  
1,608,312  
INCINERATOR  
Filed Nov. 21, 1924
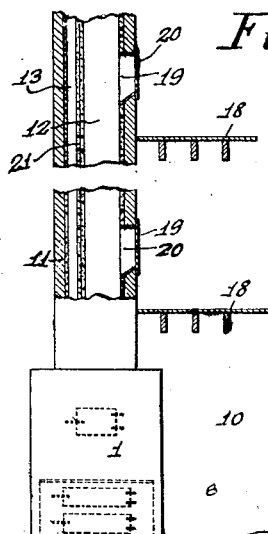
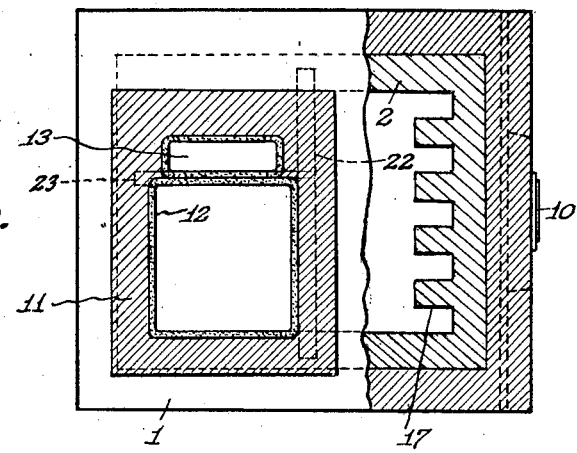
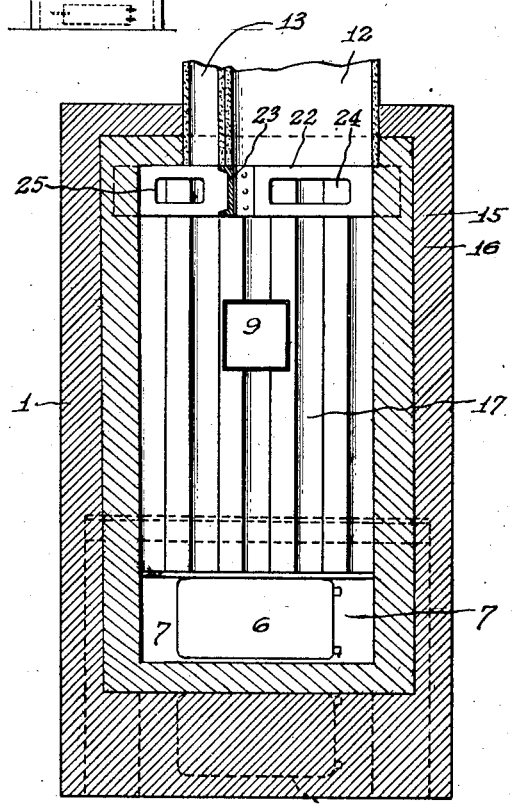
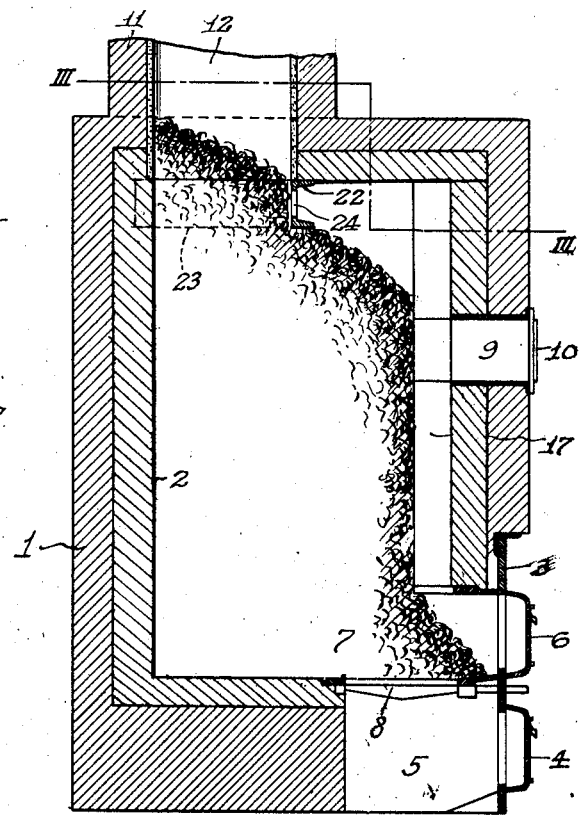
Inventor  
Frederick J. Goodenow,  
By  
Attorneys Patented Nov. 23, 1926.

1,608,312

UNITED STATES PATENT OFFICE.

FREDERICK J. GOODENOW, OF DETROIT, MICHIGAN.

INCINERATOR.

Application filed November 21, 1924. Serial No. 751,263.

This invention relates to an incinerator, and has special reference to that class of garbage and refuse burners or furnaces adapted to be built into a building, whereby the garbage and refuse from different parts of the building may be disposed of by burning. In the operation of such incinerators, the draft is often stopped by the clogging of the feed chute by the refuse, which chute is also the draft flue, and such stoppage results in escape of smoke and fumes into the building, causes a smoldering fire and often produces complete cessation in the operation of the incinerator.

These incinerators as commonly installed in apartment and other buildings have a stack or similar structure provided with a draft flue and into which flue the refuse is dumped at the several floors of the building, and this refuse accumulating in the furnace and often lodging in the flue, shuts off the draft through the flue; and it is an object of the present invention to provide a construction wherein there will always be an open passage for the smoke, gases and fumes, leading from the combustion chamber of the furnace to the stack above such stoppage or accumulation, whereby stoppage of the draft is prevented, combustion is insured, and the escape of smoke and gases into the building is prevented. A further object is to permit of the filling of the combustion chamber with refuse, thus requiring less frequent burning, and also permitting of the lighting and burning of the accumulation at the bottom of the pile where it is the driest and most combustible, so that the burning of the driest portion will dry out the moist portions above and the entire mass will be completely and rapidly consumed. A further object is to provide an incinerator which may be separately constructed and installed in the usual manner and is adaptable for installation in various building structures.

With the above and other ends in view, the invention consists in providing an auxiliary flue which is separate and distinct from the main flue which also forms the refuse chute, and connecting this separate flue with the main flue to discharge smoke and fumes into the main flue at a point or points above those places in the main flue where stoppage may occur. It also consists in providing a passage or passages leading from the lower part of the combustion chamber of the furnace and connected with said auxiliary flue, whereby the refuse may be burned from the bottom of the pile and maintenance of combustion is assured regardless of the amount of refuse in the fire chamber and main flue. The invention further consists in certain other new and useful features in the construction and arrangement, all as hereinafter more fully described and particularly pointed out in the appended claims, reference being had to the accompanying drawing, in which—

Figure 1 is a vertical longitudinal sectional view of the furnace portion and a short section of the stack of an incinerator illustrative of the present invention;

Figure 2 is a transverse vertical section of the same;

Figure 3 is a horizontal section substantially upon the line III—III of Figure 1, and Figure 4 is a side elevation of an incinerator with its stack broken away and in section, the same being drawn to a reduced scale and illustrating it as installed in a building.

In the drawing, the reference numeral 1 indicates a rectangular furnace construction of masonry which may be of any suitable form or size according to the requirements of installation, and to provide a combustion chamber 7 which may be provided with a refractory lining 2 and has the usual doorway 3 in the front wall thereof provided with a fire-door 6.

The furnace is also provided with the usual ashpit 5 having an ash door 4 and a grate 8 above the ashpit forms a portion of the bottom of the combustion chamber, when the doorway 9 may, if found desirable, be provided in the front wall of the furnace through which doorway access may be had to the upper portion of the combustion chamber for the purpose of poking the burning material or for other purposes, and this doorway is closed by a door 10.

Extending upwardly from the top of the structure, a chimney or stack 11 provides a main draft flue 12 which opens at its lower end directly into the top of the combustion chamber 7 and extends throughout the height of the stack which will preferably extend through or beyond the roof of the building and past the several floors 18 thereof. This main flue 12 not only provides a passage and creates a draft for carrying off the products of combustion and gases from the combustion chamber of the furnace, but also serves as a chute for conducting the refuse from the several flues to the combustion chamber, a short lateral chute 19 being provided at each floor through which the garbage and other refuse may be deposited in the main chute, said lateral chutes each being provided with a suitable tight closure 20, as is common in this character of structures.

To provide a passage or passages for the products of combustion and create a draft to carry off the odors and gases, when the fire chamber of the furnace has become filled with refuse as indicated in Figure 1 and so that the accumulation may be set on fire at the bottom, a vertical wall of the chamber, preferably the front wall thereof, is formed with a plurality of inwardly projecting ribs forming between them a series of vertical passages 17 extending from near the top of the grate 8 to the upper end of the chamber, each passage being open throughout its length at its inner side or toward the refuse contained in the chamber. This refuse falling into the chamber through the chute 12 will pile up against the inner edges of the ribs but will not enter the passages 17 between the ribs sufficiently to close off these passages. There is therefore always provided these open passages leading from near the grate below the accumulation of refuse, to the top wall of the furnace, so that the refuse at the bottom of the pile which has become thoroughly dried out, may be set on fire and the products of combustion will find a passage past the accumulated pile through these several passages 17. As the pile of refuse in the chamber may thus be burned from the bottom, and as the bottom of the pile is always the driest, the heat of burning and the upwardly ascending products of combustion will quickly dry out the wet garbage and refuse at the top of the heap so that the entire pile will be quickly consumed. This arrangement of passages therefore permits of filling the entire combustion chamber with refuse before burning, and the operations of burning may therefore be less frequent, giving a greater length of time for the drying out of the refuse at the bottom of the pile.

As illustrated in Figure 1, the refuse may accumulate until it not only fills the combustion chamber, but also the lower end portion of the main flue or chute 12. If this should occur, the draft through this main flue would be shut off and the products of combustion could not escape up the chimney. They would however escape into the building as would also the fumes from the accumulated refuse before it is set on fire. To provide for such a contingency and also to provide for the contingency of refuse being lodged in the main flue or chute at points between adjacent floors, the chimney or stack is provided with an auxiliary flue 13 extending along one side of and parallel with the main flue 12. This auxiliary flue opens at its lower end directly into the top of the combustion chamber of the furnace and extends upwardly in the stack any desired distance, but preferably to a point beyond the upper floor of the building or adjacent to the lateral chute 19 located at this upper floor. Openings 21 are provided at intervals throughout the length of this auxiliary flue 13, which openings afford communication between the auxiliary flue and the main flue 12. These openings 21 are located above and below the horizontal planes of the lateral chutes 19 and therefore should refuse become lodged in the main flue below any any one of the lateral chutes and stop the draft through the main flue, the smoke, fumes or gases passing up the main flue may pass through one of the openings below the stoppage in the main flue, into the auxiliary flue and then back into the main flue again through an upper opening above the stoppage. The auxiliary flue therefore provides a bypass around any stoppage which may occur in the main flue and the smoke or gases will therefore always be carried up the chimney and prevented from escape into the building.

To provide for and insure communication between the upper ends of the passages 17 and the auxiliary flue 13, an extension is provided for the wall of the main flue 12 adjacent these passages, to extend downwardly a short distance within the combustion chamber, and a like downward extension is provided for the wall dividing the main flue from the auxiliary flue. This wall extension in its preferred form as shown, is a channel beam 22 which extends across the upper end of the combustion chamber with its ends imbedded within the side walls of the chamber, and provides a support for the front side of the wall of the flue 12. A similar channel beam 23 is secured at one end to the beam 22, with its opposite end imbedded in the back wall of the chamber and forms a support for the dividing wall between the flues 12 and 13. The beam 22 which in effect is a downward extension of the front wall of the flue 12, prevents the refuse passing down the flue from accumulating within the front upper corner of the combustion chamber, and thus provides an open space within the corner at all times, no matter how full of refuse the chamber may be, and thus keeps the upper ends of the passages 17 open at all times and provides an open space between the upper ends of these passages and the extension 22 of the wall.

An opening or openings 24 are provided in the beam 22 to afford communication between this upper corner space within the chamber and the interior of the flue 12 and in a like manner an opening or openings 25 are provided in this channel beam to afford communication with the lower end of the auxiliary channel 13. The channel beam 23 is imperforate and provides a downward extension for the dividing wall between the flues 12 and 13, separating the space at the lower end of the flue 12 within the chamber from the space within the chamber at the lower end of the flue 13.

Should refuse accumulate within the combustion chamber and fill the lower end portion of the main flue 12 as illustrated in Figure 1, thus effectually closing the lower end of said flue, then the smoke and gases passing upwardly through the passages 17 may pass across the open corner space within the chamber through the opening 25 and directly into the lower end of the auxiliary flue 13. An open passage is therefore always provided from the lower part of the combustion chamber near the grate upwardly to and out through the auxiliary flue.

With the present arrangement of passages 17 which are open at one side throughout their length to the combustion chamber, the products of combustion may always enter directly into these passages and are never forced to descend within the combustion chamber in order to find an outlet to the stack. The arrangement of these passages together with the auxiliary flue insures an open passage for the products of combustion and gases at all times up the stack and out through its open upper end, and a draft is always created which effectually draws off all odors, gases and smoke. The auxiliary passage within the stack by being provided with the several openings 21 into the main flue 12 provides at all times a by-pass around any obstruction which may close the main flue and thus all odors and gases which would otherwise be trapped within the main flue will be drawn off by the draft created through this by-pass.

Obviously any suitable means other than the channel beams 22 and 23 may be provided for the purpose of affording at all times an open passage from the upper ends of the passages 17 to the lower end of the auxiliary flue, and to also provide such a passage to the lower end of the main flue when this flue is not obstructed. These channel beams however provide such a passage and at the same time afford a very rigid support for the lower end of the stack upon the upper end of the furnace. The passages 17 may also be formed other than by providing ribs upon the wall of the chamber, and it is also obvious that other changes in the specific construction and arrangement of parts as shown may be made within the scope of the appended claims without departing from the spirit of the invention, and I do not therefore limit myself to the particular construction shown.

Having thus fully described my invention, what I claim is:—

1. An incinerator including a furnace having a combustion chamber provided with a passage leading from the lower part of said chamber, and a stack for said furnace having a main flue opening into said chamber and providing a chute for refuse, and also having an auxiliary flue communicating at its lower end with the upper end of said passage and opening into said main flue intermediate the ends of the main flue.

2. An incinerator including a furnace having a combustion chamber and a stack for said furnace having a main flue opening at its lower end into the top of said chamber and providing a chute for refuse, said stack being also provided with an auxiliary flue communicating at its lower end with the upper end of the said chamber and opening at intervals into the main flue above the furnace.

3. An incinerator including a furnace and a stack for said furnace, said stack being provided with a main flue forming a chute for conducting refuse into the furnace and provided with a lateral opening through which the refuse is inserted in the main flue, said stack being also provided with a by-pass opening into the main flue above and below the transverse plane of the lateral opening.

4. An incinerator including a furnace and a stack for said furnace, said stack being formed with a main flue opening at its lower end into the furnace and providing a chute for conducting refuse into the furnace and with a lateral opening through which the refuse may be introduced into the main flue, said stack being also provided with an auxiliary flue opening at its lower end into the furnace and having communication with the main flue above and below the horizontal plane of the lateral opening.

5. An incinerator including a furnace having a combustion chamber, a vertical wall of which chamber is provided with a plurality of spaced apart ribs forming a series of open passages between the ribs leading from the lower part of the combustion chamber to the upper end thereof, and a stack structure for said furnace provided with a main flue forming a chute for conducting refuse directly into the top of said combustion chamber, said stack being also formed with a separate flue in constant communication with the open upper ends of said passages and open into said main flue above the lower end of said main flue.

6. An incinerator including a furnace having a combustion chamber, ribs extending inwardly from a vertical wall of said chamber and forming vertical passages leading from the lower end of the chamber to the upper end thereof, a stack structure for said furnace having a main flue extending throughout its length and forming a chute for conducting refuse into the furnace and also formed with an auxiliary flue opening at its lower end into the upper end of the combustion chamber, and a dividing wall extending downwardly into the combustion chamber and forming a continuation of a side wall of the main flue, said downwardly extending wall having an opening therein communicating with the upper ends of said vertical passages formed between said ribs.

In testimony whereof I affix my signature.

FREDERICK J. GOODENOW.